US006936787B2

(12) United States Patent
Tao et al.

(10) Patent No.: US 6,936,787 B2
(45) Date of Patent: Aug. 30, 2005

(54) INDUCTIVELY-COUPLED PLASMA TORCH

(75) Inventors: Hiroaki Tao, Ibaraki (JP); Jun Kitamoto, Tokyo (JP); Kenichi Sakata, Tokyo (JP)

(73) Assignees: National Institute of Advanced Industrial Science and Technology, Tokyo (JP); Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/701,752

(22) Filed: Nov. 5, 2003

(65) Prior Publication Data

US 2004/0195218 A1 Oct. 7, 2004

(30) Foreign Application Priority Data

Nov. 7, 2002 (JP) ....................................... 2002-323382

(51) Int. Cl.[7] ................................................ B23K 10/00
(52) U.S. Cl. ............................... 219/121.51; 219/121.5
(58) Field of Search ....................... 219/121.51, 121.55, 219/121.5

(56) References Cited

U.S. PATENT DOCUMENTS 3,467,471 A * 9/1969 Greenfield et al. ...... 219/121.5
4,293,220 A * 10/1981 Denton et al. .............. 356/316
5,083,004 A * 1/1992 Wells et al. ............. 219/121.5
5,233,156 A * 8/1993 Chan et al. .............. 219/121.5
6,166,379 A * 12/2000 Montaser et al. ........ 219/121.5

FOREIGN PATENT DOCUMENTS

GB 1328516 * 8/1973
JP 2931967 B2 8/1999
JP 3118567 B2 12/2000

OTHER PUBLICATIONS

Kim et al. "*Construction of a Capillary Gas Chromatography Inductively Coupled Plasma Mass Spectrometry Transfer Line and Application of the Technique to the Analysis of Alkyllead Species in Fuel*", Journal of Analytical Atomic Spectrometry, Oct. 1992, vol. 7 pps. 1147–1149.
Ebdon et al., "*Analysis of Geoporphyrins by High–temperature Gas Chromatography Inductively Coupled Plasma Mass Spectrometry and High–performance Liquid Chromatography Inductively Coupled Plasma Mass Spectrometry*", Journal of Analytical Atomic Spectrometry, Sep. 1994, vol. 9, pps. 939–943.

* cited by examiner

*Primary Examiner*—Teresa J. Walberg
(74) *Attorney, Agent, or Firm*—Ohlandt, Greeley, Ruggiero & Perle, L.L.P.

(57) ABSTRACT

An inductively-coupled plasma torch capable of holding a capillary tube coaxially with an injector tube and conveying make-up gas smoothly is provided. The inductively-coupled plasma torch of the present invention includes a guide which is held near the end portion of the injector tube, and has a through hole for holding the capillary tube coaxially with the injector tube, and means for conveying make-up gas.

6 Claims, 4 Drawing Sheets

INDUCTIVELY-COUPLED PLASMA TORCH

FIELD OF THE INVENTION

The present invention relates to a torch for introducing high-boiling point gaseous molecules into inductively-coupled plasma. In particular, the present invention relates to a torch for effectively introducing all of the high-boiling point gaseous molecules provided from a high-temperature source such as a gas chromatograph (GC), a thermal cracking furnace (pyrolyzer), or a thermogravimetric device (TG), that is, gaseous molecules of high-boiling point sample to be analyzed, into the center part of inductively-coupled plasma (ICP) without cooling and condensing the high-boiling point gaseous molecules when the high-boiling point gaseous molecules are analyzed by an inductively-coupled plasma emission spectrometry (ICP-ES) or an inductively-coupled plasma mass spectrometry (ICP-MS).

PRIOR ARTS

Conventionally, in order to introduce high-boiling point gaseous molecules provided from a high-temperature source such as a gas chromatograph (GC), a thermal cracking furnace (pyrolyzer), or a thermogravimetric device (TG) into inductively-coupled plasma, many types of inductively-coupled plasma torches have been used which are so designed that only the sample-introducing tube between the outlet of the GC, pyrolyzer, or TG and the inlet of the inductively-coupled plasma torch is electrically heated to a high temperature by means of a nichrome wire or the like, while the sample-introducing tube is kept in a high temperature by the heat conduction from the external sample-introducing tube without electrically heating the sample-introducing tube in the inductively-coupled plasma torch (see e.g. A. W. Kim, M. E. Foulkes, L. Ebdon, S. J. Hill, R. L. Patience, A. G. Barwise, S. J. Rowland: J. Anal. At. Spectrom., 7, 1147–1149 (1992), FIG. 1).

Furthermore, some types of inductively-coupled plasma torches have been used which are so designed that the sample-introducing tube in the inductively-coupled plasma torch is made of metal and is heated by feeding an electric current directly through the sample-introducing tube for electric resistance heating thereof (see e.g. L. Ebdon, E. H. Evans, W. G. Pretorius, S. J. Rowland: J. Anal. At. Spectrom., 9, 939–943 (1994), FIG. 1).

Such types of conventional inductively-coupled plasma torches have the following problems.

(1) In an inductively-coupled plasma torch which increases the temperature of the sample-introducing tube therein by heat conduction, since it is difficult to keep the temperature of the sample-introducing tube even, the nearer a portion of the end of the sample-introducing tube is to its end, the more the temperature of the portion decreases and the high-boiling point compound condenses. For this reason, it becomes impossible to analyze the high-boiling point compound, and the degree of separation of the compound separated by the gas chromatograph deteriorates.

(2) In an inductively-coupled plasma torch where the sample-introducing tube is heated by feeding an electric current directly through it, a large current flows through it because of the low electric resistance of the metal, thereby causing the great risk of electric shock (3) In an inductively-coupled plasma torch which increases the temperature of the sample-introducing tube by heat conduction, as well as an inductively-coupled plasma torch which feeds an electric current through the sample-introducing tube, if the sample-introducing tube is brought too near to the inductively-coupled plasma, electric discharge occurs and background signals increase, and furthermore the sample-introducing tube damages heavily.

(4) In any one of the inductively-coupled plasma torches stated above, it is difficult to locate the sample-introducing tube on the center axis of the inductively-coupled plasma torch, that is, coaxially with the inductively-coupled plasma torch, and hence if the high-boiling point compound out of the sample-introducing tube is not introduced into the center part of the inductively-coupled plasma, the sensitivity or accuracy of analysis for the high-boiling point compound deteriorates.

The inventors have already proposed some inventions (see JP-B 2931967 and JP-B 3118567) in order to solve such problems stated in (1) to (4). However, although any one of the inductively-coupled plasma torches stated above is so constructed that the capillary tube is disposed coaxially within the sample-introducing tube and make-up gas is conveyed between the capillary tube and the sample-introducing tube, the sensitivity or accuracy of analysis for the high-boiling point compound may have varied widely due to change of the position of the capillary tube relative to the inductively-coupled plasma torch. Furthermore, in the conventional ones, since the components for disposing the capillary tube coaxially with the sample-introducing tube are easy to be damaged, and the capillary tube is easy to move within the injector tube due to the pressure of the make-up gas, it has been difficult to correctly adjust the position of the capillary tube in the axial direction.

SUMMARY OF THE INVENTION

A purpose of the present invention is therefore to provide an inductively-coupled plasma torch wherein the capillary tube is held with stability coaxially with the injector tube, make-up gas is conveyed through the torch smoothly, and the position of the downstream end portion of the capillary tube in the axial direction may be adjusted easily.

The above problems will be solved by an inductively-coupled plasma torch comprising an injector tube; a make-up gas tube, housed in the injector tube, for conveying high-temperature make-up gas; and a capillary tube, housed in the make-up gas tube and extending to a downstream end portion of the injector tube, for conveying high-boiling point gaseous molecules with carrier gas, wherein the inductively-coupled plasma torch includes a guide which is held near the downstream end portion of the injector tube, and the guide has a through hole for holding the capillary tube coaxially with the injector tube, and means for passing the make-up gas.

The cylindrical guide has a through hole in its center part through which the capillary tube is passed, and passage grooves or passage holes for conveying make-up gas. The make-up gas tube is inserted coaxially within the body of the injector tube. The guide is disposed between the make-up gas tube and the downstream end portion of the injector tube. Because of this constitution, the capillary tube is fixed coaxially with the injector tube, and make-up gas flows to the downstream end of the injector tube smoothly.

The means for conveying make-up gas, the passage grooves, or the passage holes are provided aside from the through hole provided through the center of the guide. The passage grooves are formed to have a cross section shaped like, e.g., a U or V letter when seen from the axial direction, and are provided on the circumferential surface of the guide so as to extend to the axial direction. Because of this constitution having the passage grooves, make-up gas flows to the end portion of the injector tube smoothly.

With the outer diameter of the guide slightly less than the inner diameter of the injector tube, the outer surface of the guide and the inner surface of the injector tube come in substantially intimate contact with each other at the contact portion thereof. In this case, make-up gas does not pass through the intimate contact portion, but passes through, for example, the passage grooves provided on the circumferential surface of the guide.

Similarly, with the diameter of the through hole of the guide slightly larger than the outer diameter of the capillary tube, the surface of the through hole of the guide and the outer surface of the capillary tube may come in substantially intimate contact with each other. Make-up gas does not substantially flow through the intimate contact portion of the guide and the capillary tube.

Because of this constitution, the capillary tube is held with stability on the central axis of the injector tube, that is, coaxially with the injector tube.

The guide may be disposed near the outlet of the make-up gas tube, that is, between the downstream end of the make-up gas tube and the downstream end portion of the injector tube, being simply held by the injector tube, or being fused to the downstream end of the make-up gas tube or the downstream end portion of the injector tube. In the latter case, the number of components for the assembly may be reduced and the assemblability may be improved.

The injector tube is preferably formed such that the inner diameter of the downstream end portion of the injector tube is less than the inner diameter of the body of the inner tube. In this case, it is preferable that the inner diameter of the downstream end portion of the injector tube is at least not greater than 1.5 mm.

A thermal homogenizing pipe may be provided coaxially within the injector tube. In this case, a make-up gas tube is provided coaxially within the thermal homogenizing pipe. The thermal homogenizing pipe is composed of a heater wire and a temperature sensor, and thermal homogenizing material or filling material as required. Alternatively, the thermal homogenizing pipe may consist of a heat pipe. In this case, the heat pipe may be so designed that a make-up gas tube is laid through a through bore provided through the center of the heat pipe, or that the through bore itself is formed as the make-up gas tube. By providing a capillary tube and a make-up gas tube as integrated with a thermal homogenizing pipe in the injector tube as stated above, high-boiling point gaseous molecules may be transferred to the inductively-coupled plasma without condensing within a temperature range, e.g., from room temperature to a high-temperature region of 400° C.

When the outer diameter of the guide is larger than the inner diameter of the downstream end portion of the injector tube, flow paths for make-up gas may be provided on the end face of the guide facing the downstream end portion of the injector tube, and/or the end face of the downstream end portion of the injector tube facing the guide. The flow paths are formed with protrusions or grooves provided on the end face of the guide facing the downstream end portion of the injector tube, and/or the end face of the downstream end portion of the injector tube facing the guide. Because of this constitution, the guide and the injector tube do not come in intimate contact with each other all over the circumferential direction also at the portion overlapped in the radial direction, and thereby make-up gas may be conveyed smoothly.

Flow paths for make-up gas may be provided on the axial end face of the guide facing the make-up gas tube, and/or the axial end face of the make-up gas tube or thermal homogenizing pipe facing the guide. The flow paths are formed with protrusions or grooves provided on the axial end face of the guide facing the make-up gas tube, and/or the axial end face of the make-up gas tube or thermal homogenizing pipe facing the guide. Because of this constitution, the make-up gas tube or thermal homogenizing pipe and the guide do not come in intimate contact with each other all over the circumferential direction at the contact portion, and thereby make-up gas may be conveyed smoothly.

BRIEF DESCRIPTION OF THE DRAWINGS

FIG. 2(*b*) shows a cross section taken along line C—C in FIG. 2(*a*). FIG. 2(*c*) shows another guide having a cross-sectional shape different from that of the guide shown in FIG. 2(*b*). FIG. 2(*e*) shows a cross section of another guide having a shape different from that of the guide shown in FIG. 2(*a*).

In the drawing, numeral references are:

Figure 1:
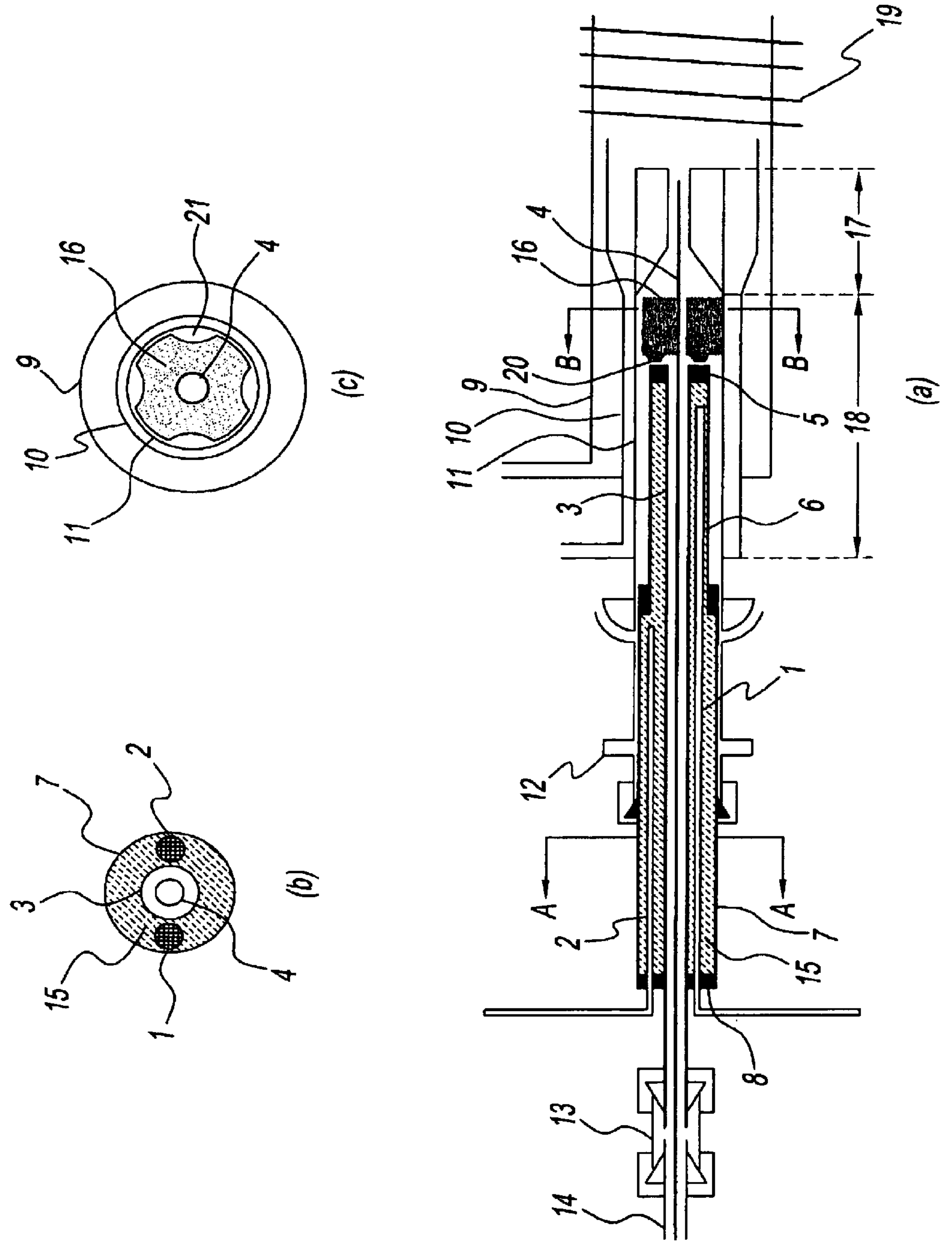
FIG. 1(*a*) shows a cross section of the whole of an inductively-coupled plasma torch for introducing high-boiling point gaseous molecules according to the present invention taken along the longitudinal axis, FIG. 1(*b*) shows a cross section taken along line A—A in FIG. 1(*a*), and FIG. 1(*c*) shows a cross section taken along line B—B in FIG. 1(*a*).

1: Heater wire
2: Temperature sensor
3: Metallic tube for make-up gas
4: Capillary tube for introducing a sample
5: Metallic plug
6, 7: Metallic pipe
8: Metallic plug
9: Outermost tube of the inductively-coupled plasma torch
10: Intermediate tube of the inductively-coupled plasma torch
11: Injector tube of the inductively-coupled plasma torch (innermost tube of the triple tube)
12: Connector with a ball joint
13: Connector
14: Metallic tube extending from a high-temperature source
15: Thermal homogenizing material
16: Guide
17: End portion of the injector tube
18: Body of the injector tube
19: Induction coil
20: Protrusion
21: Groove
22: Tapered portion

DETAILED EXPLANATION OF THE INVENTION

The present invention will be described in more detail with reference to the accompanied drawings. FIG. 1 shows an inductively-coupled plasma torch according to the present invention. FIG. 1(*a*) is an overview of the inductively-coupled plasma torch, FIG. 1(*b*) shows a cross section taken along line A—A in FIG. 1(*a*), and FIG. 1(*c*) shows a cross section taken along line B—B in FIG. 1(*a*). In FIG. 1(*a*), a capillary tube 4 for introducing the gaseous molecules of a sample to be analyzed is provided in a metallic make-up gas tube 3 for conveying make-up gas such as argon (Ar) gas. In the embodiment shown here, the make-up gas tube 3 and the capillary tube 4 are housed in a thermal homogenizing pipe which is composed of a heater wire 1, a temperature sensor 2, and thermal homogenizing material 15. The pipe itself is made of metallic material. Both ends of this metallic pipe are plugged with metallic plugs 5 and 8 so that the make-up gas tube 3 and the capillary tube 4 are integrated with the thermal homogenizing pipe. The integrated make-up gas tube 3, capillary tube 4, and thermal homogenizing pipe are inserted in the body 18 of the injector tube 11 coaxially therewith, and are coupled with the injector tube using a ball joint 12 with a connector. At the end face of the metallic plug 5, that is, at the downstream end of the make-up gas tube 3, a cylindrical guide 16 is held and disposed so as to be coaxial with the injector tube 11.

The guide 16 has a through hole for holding the capillary tube 4 in its center part, and holds the capillary tube 4 in the through hole in its center part such that the capillary tube 4 is coaxial with the injector tube 11. By making the outer diameter of the guide 16 slightly less than the inner diameter of the body of the injector tube 11, the outer surface of the guide 16 and the inner surface of the injector tube 11 come in substantially intimate contact with each other at the contact portion so that the guide 16 is held in the injector tube 11. Furthermore, by making the diameter of the through hole of the guide 16 slightly larger than the outer diameter of the capillary tube 4, the outer surface of the capillary tube 4 comes in substantially intimate contact with the inner surface of the guide 16, and the capillary tube 4 penetrates the guide 16. Because of this constitution, the capillary tube 4 is securely held coaxially with the injector tube 11, that is, having a common axis.

In addition, the guide 16 has passage grooves 21 for conveying make-up gas and which are provided through it in the axial direction. Furthermore, in the embodiment shown here, the guide 16 has protrusions 20 on the end face facing the make-up gas tube 3 so as not to block the outlet of the metallic make-up gas tube 3 to prevent the flow of make-up gas. Because of this constitution, the make-up gas which has flowed through the metallic tube 3 passes through the passage grooves 21 on the circumferential surface of the guide 16, joins, at the end 17 of the injector tube, the carrier gas which has flowed through the capillary tube 4, and is then smoothly introduced into the center part of the inductively-coupled plasma as a laminar flow. In this embodiment, the end face of the end portion of the injector tube 11 facing the guide 16 is shaped like a truncated circular cone.

In this embodiment, the guide 16 is made of quartz glass which is easy to be worked and manufactured into clean one, while the guide 16 may also be made of other material, e.g., metal, ceramic, or the like having high heat resistance and thermal conductivity like quartz glass. Materials for the metallic pipe and metallic plugs include stainless steel, while other metal or ceramic may be used if it is heat resistant and noncorrosive material. As the capillary tube 4, a silica capillary tube or stainless steel capillary tube is used which is utilized for a gas chromatograph and the inner surface of which is inactivated, while a tube made of other material may be used if its inner surface is inactivated. In this embodiment, the metallic pipe consists of metallic pipes 6 and 7, which are welded to each other to be a single pipe, while one single pipe not necessary to be welded may be used.

FIG. 1(*b*) shows a cross section taken along line A—A in FIG. 1(*a*), showing that the heater wire 1, temperature sensor 2, and thermal homogenizing material 15 are housed in the metallic pipe 7, and that the make-up gas tube 3 and capillary tube 4 are disposed coaxially with the metallic pipe 7.

FIG. 1(*c*) shows a cross section taken along line B—B in FIG. 1(*a*), showing that the outer surface of the guide 16 and the contact portions of the inner surface of the injector tube 11 are in intimate contact with each other, and that the inner surface of the guide 16 and the outer surface of the capillary tube are in intimate contact with each other. FIG. 1(*c*) also shows that the guide 16 has four through grooves 21 having a cross section shaped generally like a U letter on its outer circumferential surface.

Operation

The operation of the inductively-coupled plasma torch constituted as stated above is described below. The heater wire 1 serves to supply heat by electric resistance heating, and the temperature sensor 2 serves to measure temperature. The difference between the temperature measured by the temperature sensor 2 and the preset temperature is used for the adjustment of current supplied to the heater wire 1. The metallic pipes 6 and 7 houses the temperature sensor and the thermal homogenizing material 15 so that its internal temperature is kept even. The metallic plugs 5 and 8 are provided on the end portions of the metallic pipes, respectively, so that the thermal homogenizing material 15 does not fall off the metallic pipes. The ball joint with a connector 12 connects the metallic pipe to the injector tube 11 such that the position of the metallic pipe relative to the injector tube is adjustable in order to prevent the external air from entering the injector tube 11 of the inductively-coupled plasma torch. High-boiling point gaseous molecules provided from a high-temperature source such as a GC, pyrolyzer, or TG, and carrier gas such as helium (He) gas for carrying the high-boiling point gaseous molecules to the inductively-coupled plasma are introduced through the capillary tube 4 to the inductively-coupled plasma in the right direction in FIG. 1(*a*). Make-up gas is guided in the right direction in FIG. 1(*a*) through the inside of the metallic make-up gas tube 3 having the function of protecting the capillary tube 4 against damage, the passage grooves 21 of the guide 16, and the end portion 17 of the injector tube 11. The make-up gas joins the flow of the high-boiling point gaseous molecules and carrier gas in the end portion 17 of the injection tube 11 to send the gaseous molecules into the center part of the inductively-coupled plasma as a laminar flow.

The guide 16 has the function of holding the capillary tube 4 on the central axis of the end portion 17 of the injector tube 11 as well as the function of conveying the make-up gas through the passage grooves 21. In this embodiment, the end portion 17 of the injector tube 11 has the inner diameter less than that of the body 18 of the injector tube 11 to have the function of increasing the flow velocity of the make-up gas to effectively introduce the make-up gas and carrier gas into the center part of the inductively-coupled plasma, as well as the function of fixing the position of the guide 16 so that the guide 16 is not pushed and moved to the right direction in FIG. 1(*a*) by the make-up gas. And the protrusions 20 prevent the guide 16 from blocking the outlet of the metallic tube 3 to interfere with the flow of the make-up gas.

Since the guide 16 is affected by the heat conducted from the metallic plug 5 and the injector tube 11, the heat conducted from the high-temperature make-up gas, and the radiant heat supplied from the inductively-coupled plasma, and has a small size, for example, the total length of 5 to 10 mm, the temperature in the region of the guide 16 scarcely decreases, and thereby the high-boiling point compound does not condense. For this reason, it becomes possible to effectively introduce the high-boiling point gaseous molecules from a high-temperature source to the center part of the inductively-coupled plasma, and thereby it becomes possible to analyze these high-boiling point gaseous molecules with high sensitivity and accuracy.

Advantages of the Invention

As described above, an inductively-coupled plasma torch for introducing high-boiling point gaseous molecules according to the present invention can solve all the problems previously known in analyzing high-boiling point gaseous molecules provided from a high-temperature source such as a gas chromatograph, pyrolyzer, or thermogravimetric device by an inductively-coupled plasma emission spectrometry or inductively-coupled plasma mass spectrometry, that is, problems such as: reduction in sensitivity and/or resolution of compound caused by condensation in the inductively-coupled plasma torch; increase of background signals and damage of a sample-introducing tube caused by electric discharge between the sample-introducing tube and the inductively-coupled plasma torch; and reduction in the accuracy and sensitivity caused by the vibration of the sample-introducing tube and/or the capillary tube disposed therein and/or its deviation from the central axis of the plasma torch. Furthermore, with integration of all the components necessary to produce these effects, it becomes possible to mount and demount them to and from the inductively-coupled plasma torch, adjust their positions, and connect them to a high-temperature source such as a gas chromatograph, pyrolyzer, or thermogravimetric device.

Embodiments

Furthermore, the present invention will be described in more detail with a more specific embodiment. In this embodiment, as a capillary tube 4 for introducing gaseous molecules, for example, a silica capillary tube used for a gas chromatograph is used, the inner surface of which is inactivated and which has an inner diameter of 0.32 mm and an outer diameter of about 0.5 mm, while a capillary tube made of other material or having other inner diameter or outer diameter may be used if it has high heat resistance and its inner surface is inactivated. And, as a metallic make-up gas tube 3, e.g., a stainless steel tube having an outer diameter of 1.59 mm and an inner diameter of 1.00 mm is used, while a stainless steel tube having a size close to this may be used. One end of the metallic tube 3 is connected to the metallic tube 14 extending from a high-temperature source by a connector 13. As a matter of course, this connecting portion is heated and thermally homogenized by a well-known prior method so that high-boiling point compound does not condense. The metallic tube 3 is housed with a heater wire 1 and a temperature sensor 2 in a metallic pipe (formed into a single pipe by welding metallic pipes 6 and 7), and the gap in the metallic pipe is filled with thermal homogenizing material 15 for conducting heat evenly. As the thermal homogenizing material, ceramic powder, glass beads, metallic wires cut into short pieces, or the like may be used. Metallic plugs 5 and 8 are fitted on the end faces of the metallic pipe so that such thermal homogenizing material does not fall off the metallic pipe. Alternatively, the end faces of the metallic pipe may be covered with silver solder, heat resistant ceramic adhesive, or the like instead of being fitted with the plugs. As the metallic pipes 6 and 7, for example, a stainless steel pipe having an outer diameter of 3.40 mm and an inner diameter of 2.84 mm, and a stainless steel pipe having an outer diameter of 6.35 mm and an inner diameter of 4.75 mm may be used respectively, while pipes having other sizes may be used as appropriate if they can be housed in the injector tube 11 of the inductively-coupled plasma torch and can house the heater wire 1, temperature sensor 2, and metallic make-up gas tube 3. In many inductively-coupled plasma torches used for ordinary solution atomization, the inner diameter of the portion other than the end portion of the injector tube is about 4 mm and its outer diameter is about 6 mm throughout it, and hence it is preferable that the outer diameter of the metallic pipe 6 is limited to 4 mm or less.

The metallic pipe 7 is coupled to the inductively-coupled plasma torch by the connector 12. The position of the metallic pipe in the axial direction in the injector tube 11 may be adjusted with the screw portion of the connector 12 (the left portion of the connector 12 in FIG. 1(*a*)). Furthermore, the angle between the metallic pipe and the injector tube 11 may be adjusted with the ball joint portion of the connector 12 (the right portion of the connector 12 in FIG. 1(*a*)) such that the metallic pipe becomes parallel with the injector tube 11.

Figure 2:
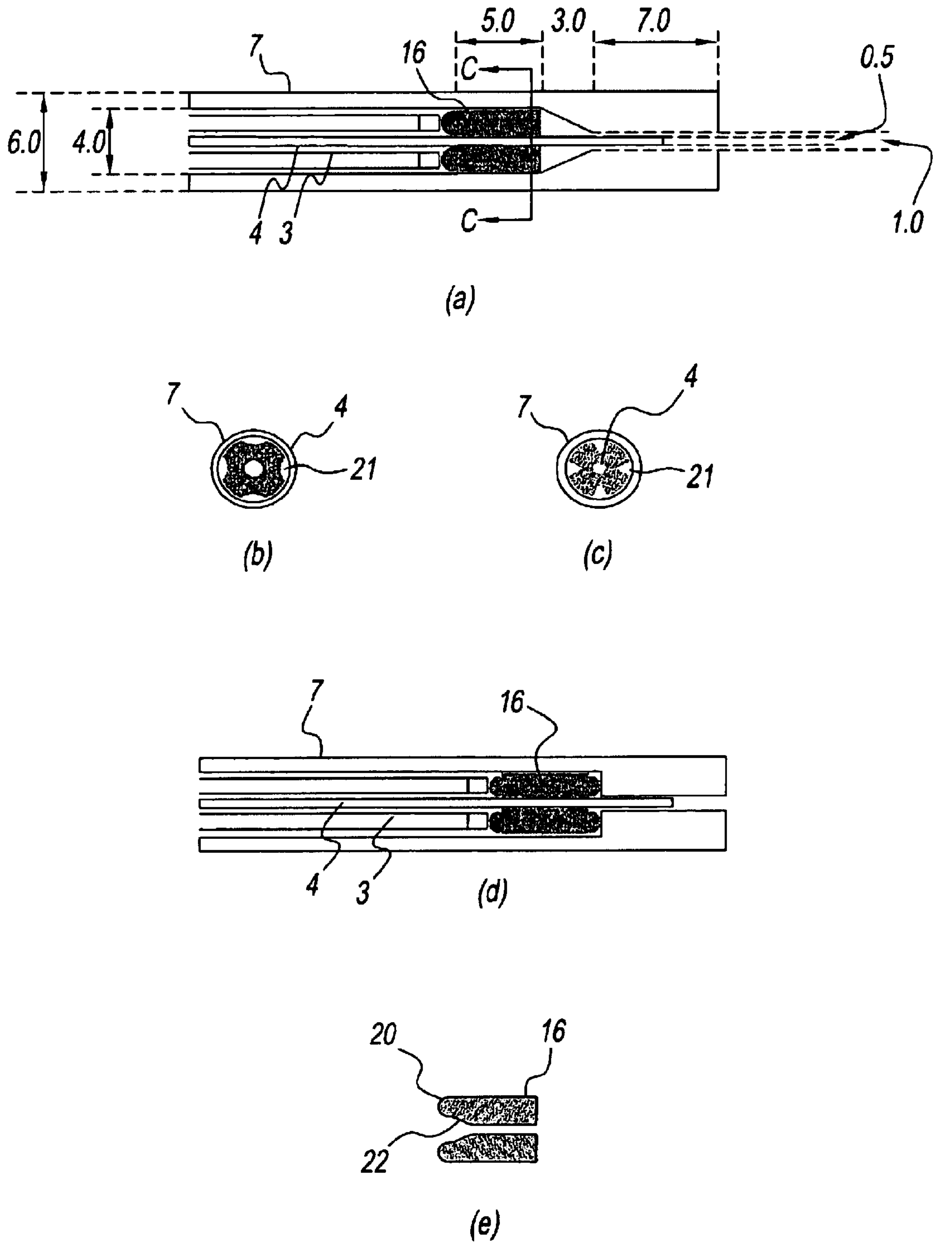
FIGS. 2(*a*) and 2(*d*) show the shapes of end position relations among a guide, an injector tube, and a capillary tube according to the present invention. Each of them shows a cross section taken along the longitudinal axis.

As shown in FIG. 2(*a*), as the guide 16, a quartz glass tube having an inner diameter, that is, diameter of the through hole in the center part, of about 0.5 mm, an outer diameter of 4.0 mm, and a length of 5.0 mm may be used. In this embodiment, the inner diameter of the guide 16 is nearly equal to the outer diameter (about 0.5 mm) of the capillary tube 4 so that the through hole of the guide 16 may be in intimate contact with and hold the capillary tube 4. The outer diameter of the guide 16 is nearly equal to the inner diameter (4.0 mm) of the body 18 of the injector tube 11 so that the guide 16 is strictly put in the injector tube 11. Furthermore, passage grooves 21 are formed on the outer circumferential surface of the guide 16 so that the make-up gas which has flowed through the metallic tube 3 flows smoothly. The passage grooves 21, e.g., four grooves each having, e.g., a depth of about 0.5 mm and a width of about 1 mm may be formed at regular intervals in the circumferential direction. However, the depth, width, and number of the passage grooves may be selected as appropriate if the strength of the guide can be kept and the make-up gas can flow smoothly. Furthermore, the cross section of the passage grooves is preferably shaped generally like a U letter as shown in FIG. 2(*b*) or generally like a V letter as shown in FIG. 2(*c*) because of easy formation, while other shapes may be adopted and passage holes may be formed instead of the passage grooves.

The end portion 17 of the injector tube 11 may be so formed, as shown in FIG. 2(*a*), that, for example, the inner diameter of the portion having a length of 7.0 mm is 1.0 mm, and the continuing portion having a length of 3.0 mm is tapered and shaped like a truncated circular cone having an inner diameter increasing up to 4.0 mm so as to connect to the body 18. Alternatively, as shown in FIG. 2(*d*), the end portion may be so formed that the inner diameter of the portion having a length of 7.0 mm is 1.0 mm, and the other portion is directly formed as the body having an inner diameter of 4.0 mm. When the injector tube having the structure shown in FIG. 2(*a*) is used, if the end face of the guide 16 facing the metallic plug 5 is flat, it blocks the outlet of the metallic tube 3 to cause the make-up gas not to flow. It is therefore preferable that the guide 16 is provided with protrusions 20 to make flow paths for make-up gas so as not to block the outlet of the metallic tube 3. The protrusions 20 may be so formed that, e.g., four circular cylinders of quartz glass each having, e.g., a height of 1.0 mm and a diameter of 1.0 mm are fused and integrated with the guide 16, while other sizes, material, and number of the protrusions may be adopted as appropriate, or grooves may be so provided, instead of the protrusions, to have the same function as the protrusions. When the injector tube having the structure shown in FIG. 2(*d*) is used, it is preferable that protrusions 20 are provided on both ends of the guide 16 for the same reason. For the guide 16, quartz glass is preferably used because it is easy to be worked and manufactured into clean one, while other material such as ceramic or stainless steel may be used if it has high thermal conductivity.

When the guide 16, the metallic pipe in which the metallic make-up gas tube 3 is housed, and the capillary tube 4 are disposed in the injector tube 11, the guide 16 and the metallic pipe are inserted in the injector tube 11 in order, and then the capillary tube 4 is inserted in the through hole in the center part of the guide 16. For easy insertion of the capillary tube 4, a taper portion 22 as shown in FIG. 2(*e*) may be provided at the inlet portion of the through hole of the guide 16. Since the sensitivity obtained by an inductively-coupled plasma mass spectrometry or an inductively-coupled plasma emission spectrometry varies according to the position of the downstream end of the capillary tube 4, the end portion 17 of the injector tube 11 is preferably made of, e.g., optically transparent material such as quartz glass so that the optimum position of the downstream end of the capillary tube can be adjusted while being monitored. The optimum position of the downstream end of the capillary tube may be adjusted without being monitored. In this case, opaque material may be used for the end portion 17.

Figure 3:
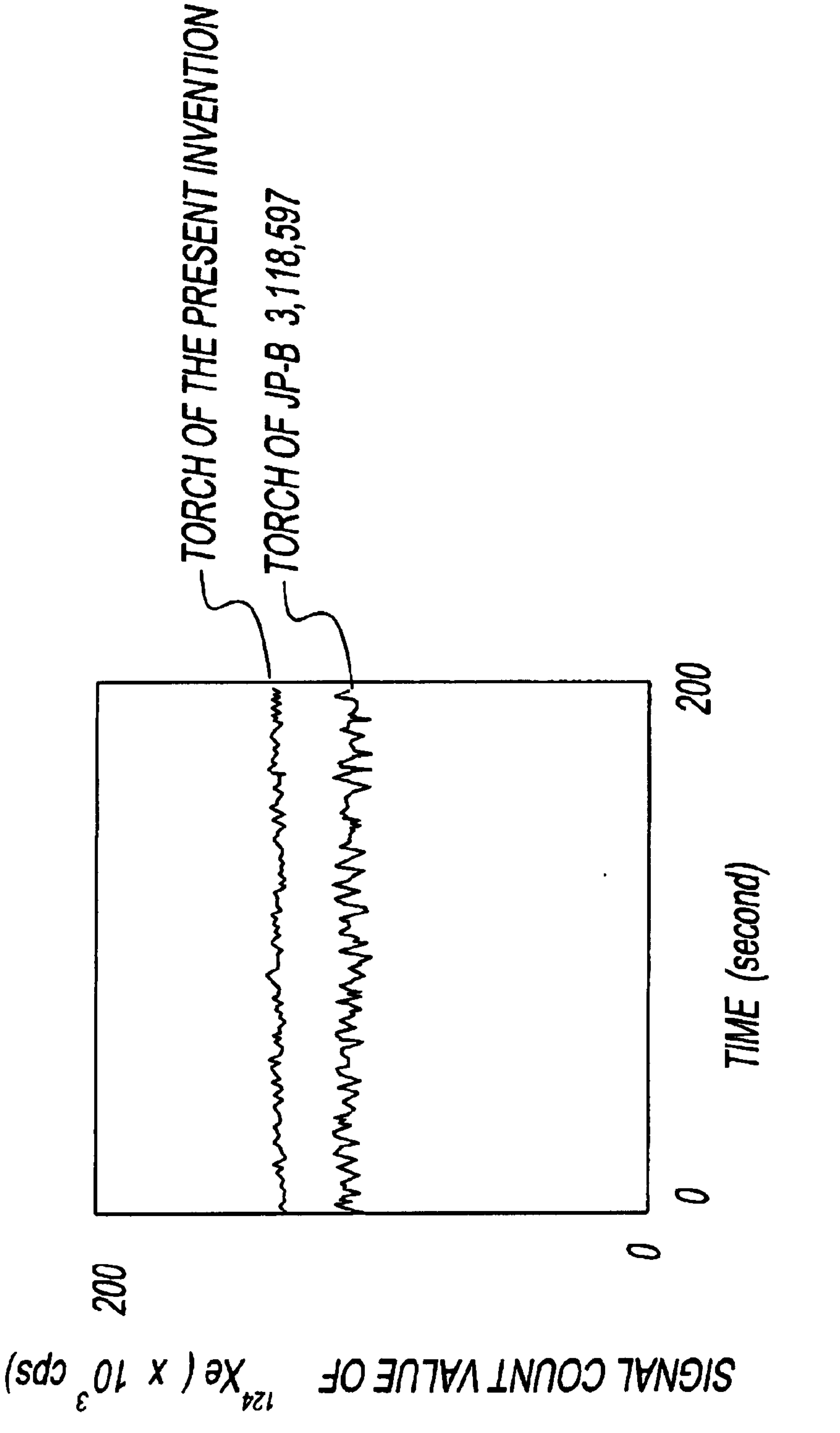
FIG. 3 shows a comparison of signal count values of $^{124}$Xe obtained by an inductively-coupled plasma mass spectrometer using an inductively-coupled plasma torch for introducing high-boiling point gaseous molecules according to the present invention or the inductively-coupled plasma torch for introducing high-boiling point gaseous molecules described in JP-B 3118567.
Figure 4:
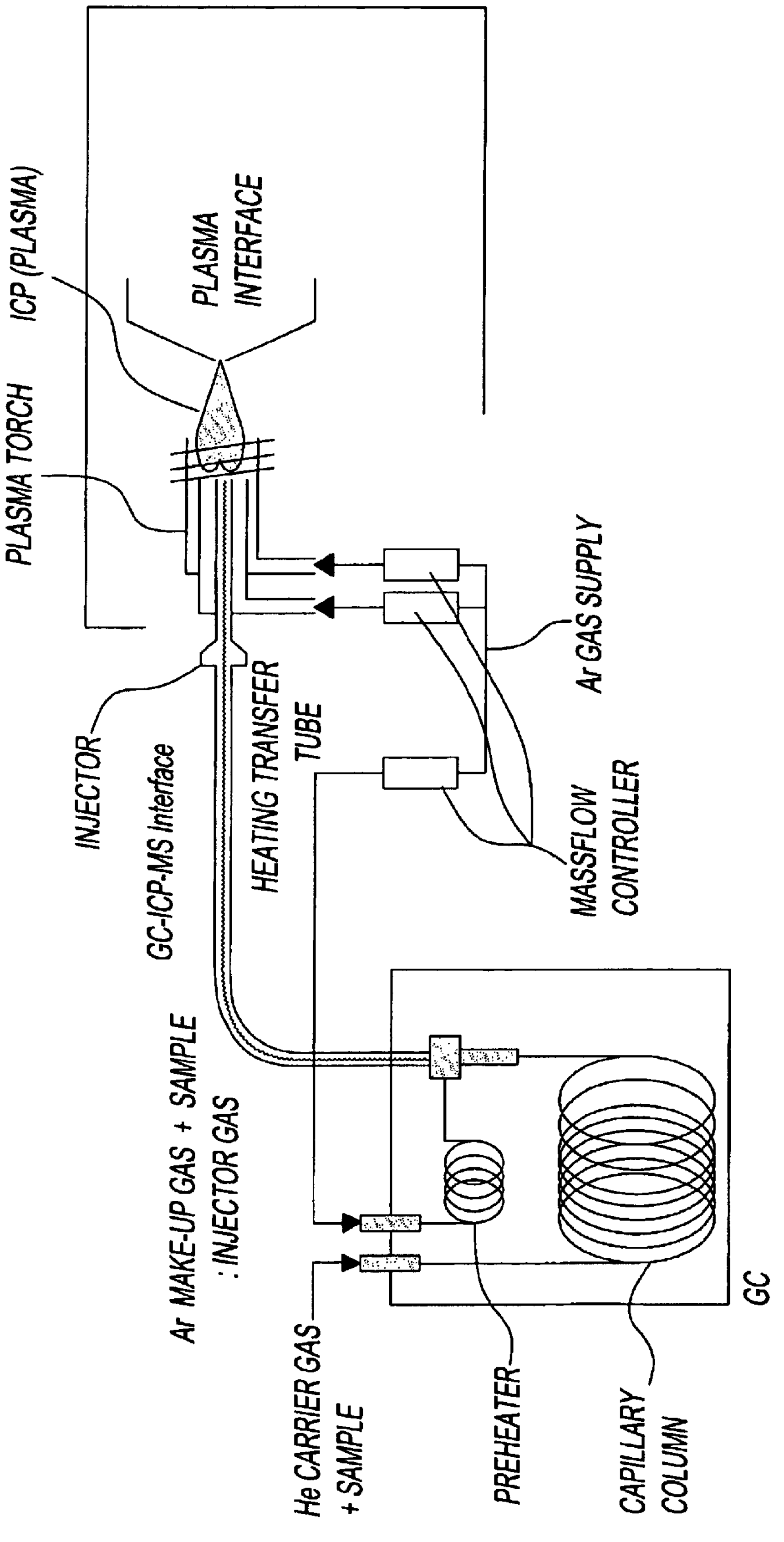
FIG. 4 is a schematic diagram of an inductively-coupled plasma mass spectrometer on which an inductively-coupled plasma torch for introducing high-boiling point gaseous molecules according to the present invention is mounted.

An inductively-coupled plasma torch for introducing high-boiling point gaseous molecules according to the present invention comprising a guide, a metallic tube, a capillary column, and an injector tube having sizes shown in FIG. 2(*a*), or a inductively-coupled plasma torch for introducing high-boiling point gaseous molecules described in JP-B 3118567 was mounted on an inductively-coupled plasma mass spectrometer shown in FIG. 4, and the measurement of $^{124}$Xe was conducted. The change of signal intensity with respect to time measured at the measurement of $^{124}$Xe is shown in FIG. 3. In FIG. 3, the horizontal axis indicates time, and the vertical axis indicates signal count values of $^{124}$Xe obtained when Xe of 1000 ppm (diluted with Ar gas) was conveyed through the capillary tube in the flow rate of 20 mL/min and the make-up gas of Ar was conveyed through the metallic tube in the flow rate of 1 L/min. The relative standard deviation was 0.65 (%) when the inductively-coupled plasma torch for introducing high-boiling point gaseous molecules of the present invention was used, and the relative standard deviation was 2.0 (%) when the plasma torch described in JP-B 3118567 was used. Consequently, it is appreciated that the relative standard deviation of signal count values for the plasma torch of the present invention is reduced to about a third of that of the plasma torch described in JP-B 3118567, and hence has a higher precision. In addition, it is appreciated from FIG. 3 that the signal intensity and sensitivity are higher when the plasma torch of the present invention is used.

What is claimed is:

1. An inductively-coupled plasma torch comprising:

an injector tube;

a make-up gas tube, housed in said injector tube, for conveying high-temperature make-up gas; and a capillary tube, housed in said make-up gas tube and extending to a downstream end portion of said injector tube, for conveying high-boiling point gaseous molecules with carrier gas, wherein the inductively-coupled plasma torch includes a guide which is held near the downstream end portion of said injector tube, and over the downstream end of said make-up gas tube, wherein said guide faces the downstream end thereof, and the guide has a through hole for holding said capillary tube coaxially with said injector tube, and means for passing said make-up gas.

2. The inductively-coupled plasma torch of claim 1, wherein said make-up gas tube is housed in a thermal homogenizing pipe which is disposed coaxially within said injector tube, and said thermal homogenizing pipe is composed of a heater wire and a temperature sensor and/or thermal homogenizing material.

3. The inductively-coupled plasma torch of claim 2, wherein said thermal homogenizing pipe is composed of a heat pipe having a through bore at its center, and wherein said make-up gas tube penetrates the through bore of said heat pipe, or the through bore of said heat pipe is formed in itself as a make-up gas tube through which said make-up gas is passed.

4. The inductively-coupled plasma torch of claim 2, wherein a flow path for said make-up gas is provided on an axial end face of said guide facing the downstream end portion of said injector tube, and/or an axial end face of the downstream end portion of said injector tube facing said guide.

5. The inductively-coupled plasma torch of claim 2, wherein a flow path for said make-up gas is provided on an axial end face of said guide facing said make-up gas tube, and/or an axial end face of said make-up gas tube or said thermal homogenizing pipe facing said guide.

6. The inductively-coupled plasma torch of claim 2, wherein said guide has a groove.

* * * * *